(12) United States Patent
Pepke

(10) Patent No.: US 12,340,208 B2
(45) Date of Patent: Jun. 24, 2025

(54) METHOD FOR UPDATING SOFTWARE

(71) Applicant: Robert Bosch GmbH, Stuttgart (DE)

(72) Inventor: Jan Pepke, Remseck A.N. (DE)

(73) Assignee: ROBERT BOSCH GMBH, Stuttgart (DE)

( * ) Notice: Subject to any disclaimer, the term of this patent is extended or adjusted under 35 U.S.C. 154(b) by 74 days.

(21) Appl. No.: 18/245,386

(22) PCT Filed: Sep. 21, 2021

(86) PCT No.: PCT/EP2021/075935
§ 371 (c)(1),
(2) Date: Mar. 15, 2023

(87) PCT Pub. No.: WO2022/063773
PCT Pub. Date: Mar. 31, 2022

(65) Prior Publication Data
US 2023/0359456 A1  Nov. 9, 2023

(30) Foreign Application Priority Data

Sep. 28, 2020  (DE) .................... 10 2020 212 139.7

(51) Int. Cl.
*G06F 12/00* (2006.01)
*G06F 3/06* (2006.01)
*G06F 8/654* (2018.01)
*G06F 9/455* (2018.01)
*G06F 12/02* (2006.01)
*G06F 13/28* (2006.01)
*H04L 67/12* (2022.01)

(52) U.S. Cl.
CPC .............. *G06F 8/654* (2018.02); *H04L 67/12* (2013.01)

(58) Field of Classification Search
CPC .... G06F 8/654; G06F 12/0246; G06F 3/0679; G06F 3/0659; G06F 3/064; G06F 3/0656; G06F 3/0604; G06F 12/0868; G06F 12/0802; G06F 3/0685; G06F 3/0647; G06F 3/0635; G06F 12/08; G06F 13/4239; H04L 67/12
See application file for complete search history.

(56) References Cited

U.S. PATENT DOCUMENTS 6,370,628 B2 *  4/2002  Beppu ................... G06F 3/0653
                                                          365/230.01
6,434,658 B1 *  8/2002  Fukuzumi ............. G06F 3/0626
                                                          711/217

(Continued)

OTHER PUBLICATIONS

International Search Report for PCT/EP2021/075935, Issued Dec. 9, 2021.

*Primary Examiner* — Thuy Dao
(74) *Attorney, Agent, or Firm* — NORTON ROSE FULBRIGHT US LLP

(57) ABSTRACT

A method for updating software stored in a memory. The memory is divided into sectors. The software is updated by the writing of data into the memory. The data for updating the software are written from an arrangement into a further memory, in which further memory the data are temporarily stored, until the amount of data written into the further memory reaches a specific value. After the value has been reached, the data written into the further memory are transferred into the memory which is divided into sectors.

10 Claims, 2 Drawing Sheets

(56) References Cited

U.S. PATENT DOCUMENTS

| | | | |
|---|---|---|---|
| 9,280,477 B2* | 3/2016 | Friendshuh | G06F 12/0868 |
| 2003/0182414 A1 | 9/2003 | O'Neill | |
| 2004/0093487 A1* | 5/2004 | Fuse | G06F 11/1417 |
| | | | 713/1 |
| 2013/0198732 A1* | 8/2013 | Fujita | G06F 8/65 |
| | | | 717/170 |
| 2017/0017485 A1* | 1/2017 | Ye | G06F 8/656 |
| 2019/0342152 A1* | 11/2019 | Troia | H04L 41/082 |

* cited by examiner

METHOD FOR UPDATING SOFTWARE

FIELD

The present invention relates to a method for updating software and an arrangement for carrying out the method.

BACKGROUND INFORMATION

Updating software enables software to be adapted, for example to implement new functions, correct programming errors and/or meet changed requirements with respect to operational and data security.

Due to the increased use of software in more and more areas, an increased need for software updates is to be expected. For this reason, a new approach or a reorganization of the implementation of software updates seems to be necessary.

When software is used in mobile units, such as in motor vehicles, a software update typically means that the motor vehicle needs to be taken to the workshop and the motor vehicle is consequently not available to the driver for a period of time. Such burdensome and often inconvenient workshop visits should be avoided whenever possible. The objective is therefore to send the data used for software updates wirelessly directly to the end customer.

It should furthermore also be noted that, depending on the respective component in the vehicle the software of which is to be updated, the vehicle cannot be moved as long as the software update is being carried out. For this reason, procedures are being sought with which non-operational phases of a vehicle, so-called vehicle downtimes, due to a software update being carried out can be reduced. This is intended to lead to increased user acceptance and accelerated introduction of updated software, in particular when the traceability of critical updates is required.

One of the approaches to reduce vehicle downtime is the use of additional flash memory in the target ECU (electronic control unit). Target ECUs can, for example, be assigned to the brake, the airbag, the radar etc. The new software can then be installed while the vehicle is in a normal operating mode, e.g., while driving. At the end of installation, when the vehicle is stationary, the new software which is already on the target ECU is simply activated. Activation takes significantly less time than reprogramming the entire control unit.

Since installation while driving means that data transmission or data transfer takes place on vehicle buses, such as CAN, CAN-FD, etc., this can constitute a high load on the bus. This should be avoided if possible. Hence, it is conventional to intentionally carry out a data transfer via the vehicle bus slowly. An installation can be organized in such a way, for example, that it takes 45 minutes to complete. The installation phase can be interrupted a few times, however, e.g., by ignition off-on cycles, since these represent normal driver behaviors.

SUMMARY

A method is provided according to the present invention. Example embodiments of the present invention are disclosed herein.

The presented method according to the present invention is used for updating software stored in a memory which is divided into sectors. A flash memory can be used here as the memory, for example. The software is updated by writing data to the memory. The data for updating the software are written by an arrangement, which has typically received said data in advance, to a further memory, e.g. a RAM module. According to an example embodiment of the present invention, the data are temporarily stored in the further memory until the amount of data written in the further memory reaches a specific value. The data written in the further memory are then transferred to the memory which is divided into sectors. This process is typically brought about by the arrangement and is triggered by reaching said amount.

The value for the amount, the reaching of which triggers writing to the memory comprising sectors, can depend on the size of the sectors of the memory. The value of the amount can thus be determined such that the amount of data is sufficient for at least one of the sectors to be fully written to. In one embodiment, it is provided that data will be written to the further memory until the amount of data is sufficient to fully write exactly one sector. This is then carried out.

In one example embodiment of the present invention, the data are initially sent via a bus from a central unit to the arrangement. The arrangement then receives these data, which is subsequently written to the further memory by the arrangement.

The central unit in turn can receive the data to be sent to the arrangement via a wireless connection. The central unit is then a central control unit in a motor vehicle, for example, which receives the data for updating software wirelessly or over-the-air and then passes the data to the corresponding target ECUs in the motor vehicle, typically via the bus of the motor vehicle.

The data that have been written by the arrangement to the further memory is typically deleted from the further memory after being transferred to the memory which is divided into sectors.

The presented method according to the present invention thus may make it possible to prevent a complete restart of the installation. Installation can be resumed after being interrupted, i.e., the installation can be interrupted, e.g., by ignition off, and continued, e.g., by ignition on.

A flash memory is a digital memory module that is used for non-volatile storage of data. Unlike other read-only memories, it is not possible to clear or overwrite individual memory cells in flash memories. Rather, flash memory is divided into sectors, which can all be the same size or also different sizes. These sectors can only be written to and also cleared in one operation. This means that, if a sector has only been partially written to in one write operation, no further data can be written to that sector in a next write operation. Instead, this sector has to be cleared completely first before data can be written to this sector again in the next write operation.

The presented arrangement according to the present invention is used to carry out the method and is implemented in hardware and/or software, for example. The arrangement can moreover be integrated in a control unit, typically a target ECU, or configured as such.

Via a bus from a central unit, e.g., a central unit in a motor vehicle, for example, the arrangement thus receives data that are used to update software and is in turn stored in a flash memory. The arrangement then does not write the received data directly to the flash memory, but instead to a further memory, a buffer or cache, until the amount of received and temporarily stored data reaches a value that is predefined and depends, for example, on the size of the sectors of the flash memory. As soon as this value or amount is reached, a write operation is triggered and the temporarily stored data are written from the further memory to the flash memory.

Further advantages and embodiments of the present invention will emerge from the description herein and the figures.

It goes without saying that the aforementioned features and the features yet to be explained in the following can be used not only in the respectively specified combination, but also in other combinations or on their own, without leaving the scope of the present invention.

DETAILED DESCRIPTION OF EXAMPLE EMBODIMENTS

The present invention is illustrated schematically in the figures on the basis of embodiments and is described in detail in the following with reference to the figures.

Figure 1:
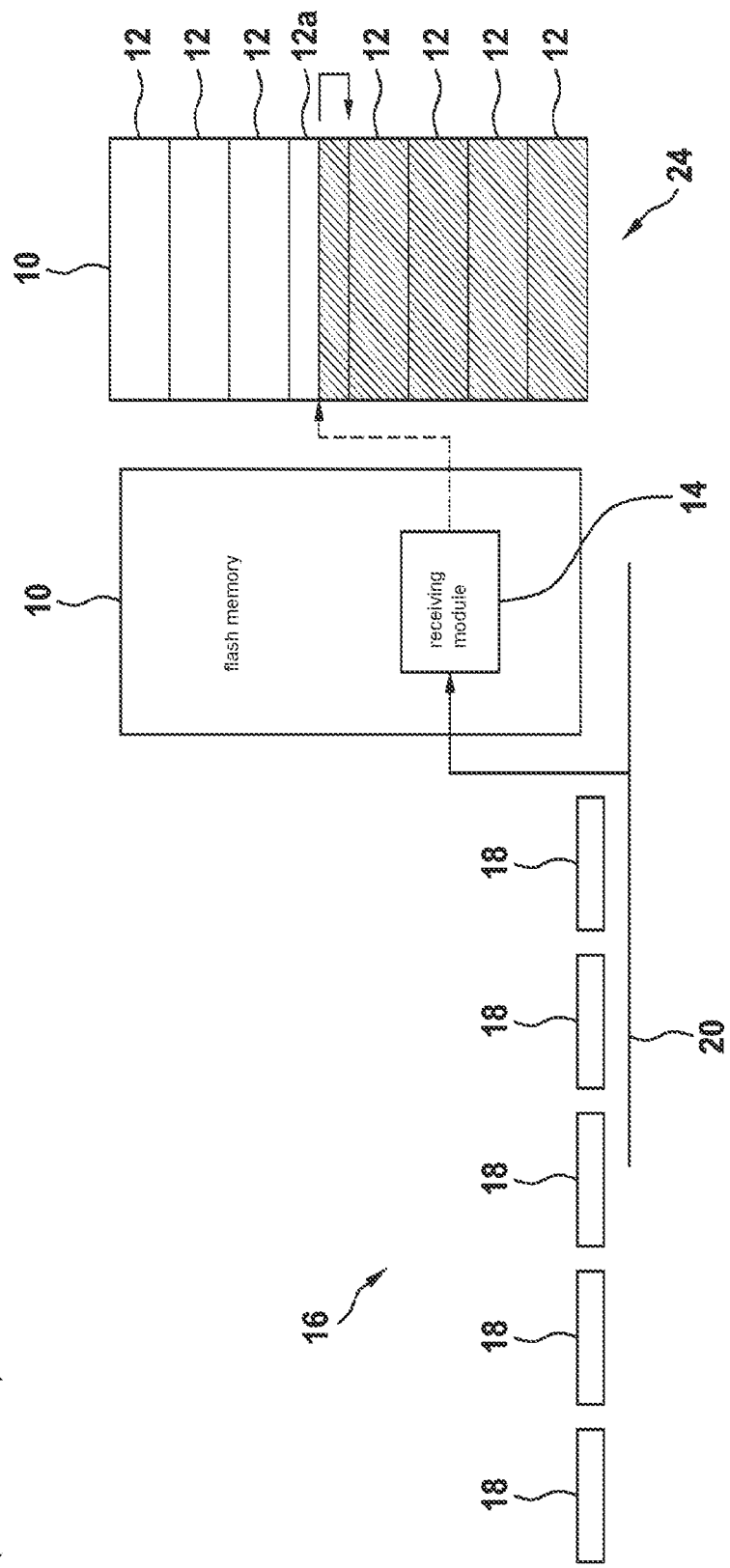
FIG. 1 shows a schematic illustration of a flash memory to clarify the approach according to the related art.

FIG. 1 shows a flash memory which as a whole is identified with the reference number 10. The right-hand side shows the flash memory 10 with its sectors 12, each of which has a capacity of 32 kB. Assigned to the flash memory 10 is a receiving module 14 that receives a data stream 16, which in turn includes a number of data packets 18 that can vary in size, via a bus 20. The data stream 16 is typically placed on the bus 20 by a central unit and sent to the flash memory 10 to which a target ECU is assigned.

The central unit can receive the data stream 16 or the data given by the data packets 18 wirelessly, i.e. over-the-air (OTA). A software 24, which is to be updated by writing the data of the data stream 16 to it, is stored on the flash memory 10.

If the data obtained via the receiving module 14 are now written to the flash memory 10, it is possible that the data stream is interrupted at a point in time at which a sector 12, in this case sector 12a, has not yet been completely written to. When writing to the flash memory 10 is resumed, the most recently programmed addresses in the flash memory 10 are determined. If this address is within a flash sector 12 and the target ECU is to continue the installation, this sector 12a is cleared. This is required by the specification of the flash memory 10 of the microcontroller of the target ECU. This means that sector 12a has to first be cleared prior to writing.

The number of delete accesses is limited by the specification of the flash memory 10 of the microcontroller. Therefore, every resumption causes an incrementing of the clear counter, which then runs to a set upper value. When this upper limit value is reached, deletion is no longer possible. The flash memory 10 can thus no longer be written to. This consequently limits the update cycles.

Figure 2:
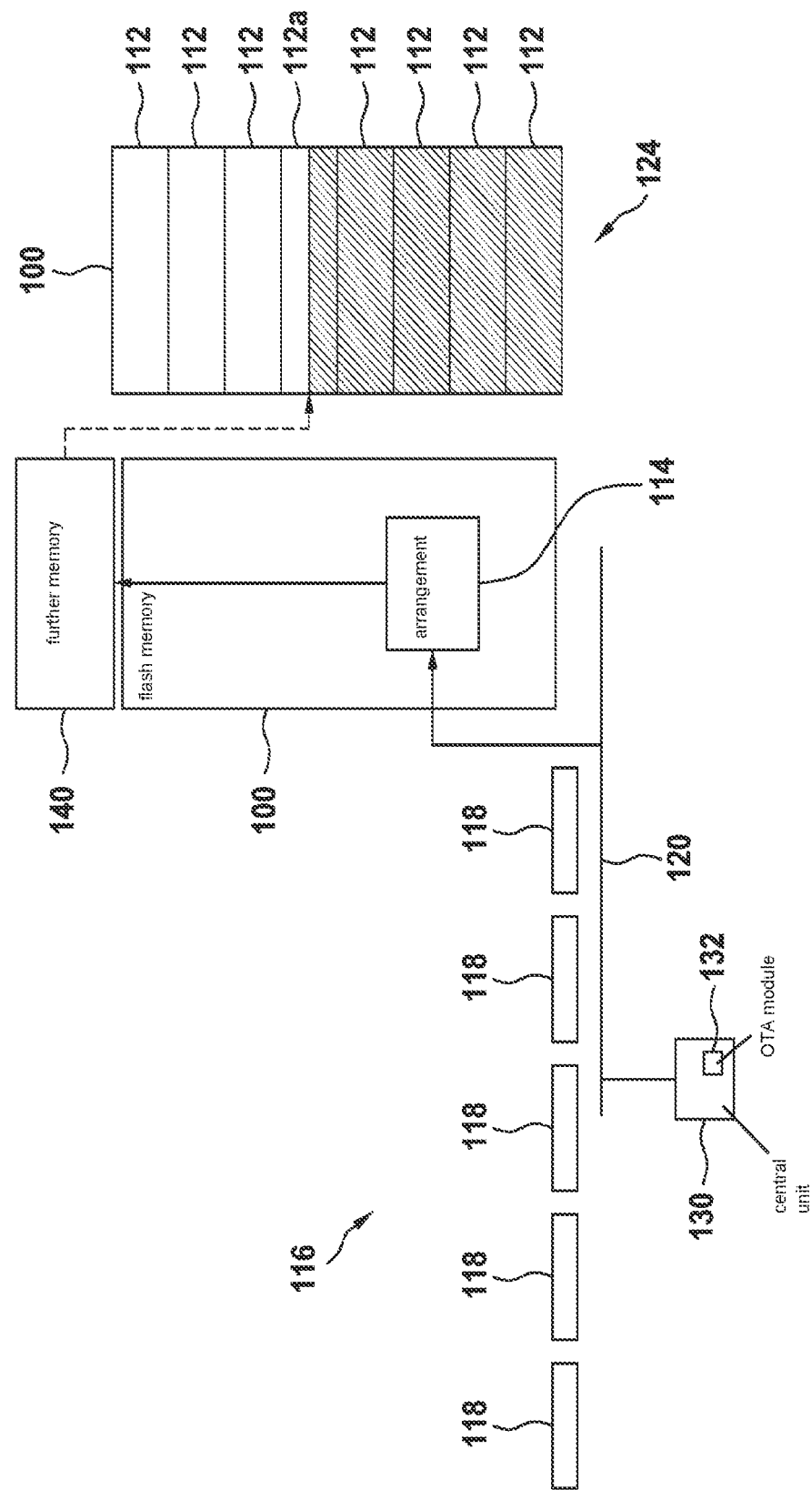
FIG. 2 shows a schematic illustration of a flash memory described according to one example embodiment of the presented method of the present invention.

The following is now provided according to the present invention with reference to FIG. 2:

FIG. 2 shows a flash memory which as a whole is identified with the reference number 100 and represents a memory which is divided into sectors. The right-hand side shows the flash memory 100 with its sectors 112, each of which has a capacity of 32 kB. Assigned to the flash memory 100 is an arrangement 114 that receives a data stream 116, which in turn includes a number of data packets 118 that can vary in size, via a bus 120. In this case, the data stream 116 is placed on the bus 120 by a central unit 130 and sent to the flash memory 100 to which a target ECU is assigned. The central unit 130 can receive the data stream 116 or the data given by the data packets 118 wirelessly, i.e., over-the-air (OTA), via a corresponding OTA module 132. A software 124, which is to be updated by writing the data of the data stream 116 to it, is stored on the flash memory 100.

The intent is now to avoid the clearances of sectors 112 in the event of resumption required according to the related art. The arrangement 114 receives the incoming data packets 118 having different lengths. In this approach, a further memory 140, in this case a volatile memory with direct memory access (random access memory—RAM) is provided which serves to buffer the incoming data packets 118. This further memory 140 can thus also be referred to as a buffer or cache.

As soon as the arrangement 114 has received sufficient data to write to a sector 112 and has moved it to the further memory 140, these data are written to a sector 112, in this case the sector 112a, under the control of the arrangement 114. Sector 112a is thus fully written to. It is important that the amount of data received by the arrangement 114 and which then triggers writing to the flash memory 100 by the arrangement 114 typically depends on the size of the sectors 112 of the flash memory 100.

In the shown embodiment, the amount of temporarily stored data is always such that a sector 112 can be fully written to during each write operation. It is, however, certainly also possible to set it such that sectors 112 are only written to a certain extent, or that a number of sectors are always written to completely or some are only written to partially during one write operation. This can be specified by a user, who can then set the arrangement 114 accordingly. This can also take into account that sectors 112 of flash memory 100 can have different sizes. The arrangement 114 can then select the respective sectors 112 that are best suited to the amount of received and temporarily stored data.

This approach ensures that, at each resumption, the flash memory 100 can be programmed to the sector limit and consequently clearance of partially programmed sectors 112 is not necessary.

The invention claimed is:

1. A method for updating software stored in a memory which is divided into sectors, wherein the software is updated by writing data to the memory, the method comprising the following steps:
   writing, by an arrangement, the data for updating the software to a further memory in which the data are temporarily stored until the amount of data written in the further memory reaches a specific value that depends on a size of the sectors of the memory; and
   after reaching the specific value, transferring the data written in the further memory to the memory which is divided into sectors.

2. The method according to claim 1, wherein a flash memory is used as the memory which is divided into sectors.

3. The method according to claim 1, wherein the specific value of the amount is set such that, while the further memory has been partially written to, the transfer cannot begin unless the amount of data that has been written to the further memory reaches an amount sufficient for at least one of the sectors to be fully written to.

4. The method according to claim 1, wherein the data are initially sent via a bus from a central unit to the arrangement that receives the data.

5. The method according to claim 4, wherein the central unit receives the data to be sent to the arrangement via a wireless connection.

6. The method according to claim 4, wherein a RAM module is used as the further memory.

7. The method according to claim 4, wherein the data in the further memory are deleted from the further memory after being transferred to the memory which is divided into sectors.

8. An arrangement for updating software configured to update software stored in a memory which is divided into sectors, wherein the software is updated by writing data to the memory, the arrangement comprising a processor system, wherein the processor system is configured to:
   write, by an arrangement, the data for updating the software to a further memory in which the data are temporarily stored until the amount of data written in the further memory reaches a specific value that depends on a size of the sectors of the memory; and
   after reaching the specific value, transfer the data written in the further memory to the memory which is divided into sectors.

9. The arrangement according to claim 8, wherein the arrangement is a control unit of a motor vehicle.

10. The arrangement according to claim 8, wherein the specific value of the amount is set such that, while the further memory has been partially written to, the transfer cannot begin unless the amount of data that has been written to the further memory reaches an amount sufficient for at least one of the sectors to be fully written to.

\* \* \* \* \*